United States Patent
West

(10) Patent No.: US 8,648,498 B1
(45) Date of Patent: Feb. 11, 2014

(54) PHOTOVOLTAIC POWER SYSTEM WITH DISTRIBUTED PHOTOVOLTAIC STRING TO POLYPHASE AC POWER CONVERTERS

(71) Applicant: Richard Travis West, Ragged Point, CA (US)

(72) Inventor: Richard Travis West, Ragged Point, CA (US)

(73) Assignee: Renewable Power Conversion, Inc, San Luis Obispo, CA (US)

( * ) Notice: Subject to any disclaimer, the term of this patent is extended or adjusted under 35 U.S.C. 154(b) by 0 days.

(21) Appl. No.: 13/680,941

(22) Filed: Nov. 19, 2012

(51) Int. Cl.
H02J 3/38 (2006.01)
H02M 7/42 (2006.01)

(52) U.S. Cl.
USPC .......................................................... 307/82

(58) Field of Classification Search
USPC ............................................................ 307/82
See application file for complete search history.

(56) References Cited

U.S. PATENT DOCUMENTS

| | | | | |
|---|---|---|---|---|
| 6,111,767 A * | 8/2000 | Handleman | ..................... | 363/95 |
| 6,285,572 B1 * | 9/2001 | Onizuka et al. | ................. | 363/72 |
| 6,750,391 B2 * | 6/2004 | Bower et al. | .................. | 136/244 |
| 6,838,611 B2 * | 1/2005 | Kondo et al. | ................. | 136/244 |
| 7,301,755 B2 * | 11/2007 | Rodriguez et al. | ............ | 361/676 |
| 7,772,716 B2 * | 8/2010 | Shaver et al. | ................... | 307/31 |
| 7,824,191 B1 * | 11/2010 | Browder | ...................... | 439/76.1 |
| 7,898,212 B2 * | 3/2011 | Benn et al. | ..................... | 320/101 |
| 8,035,249 B2 * | 10/2011 | Shaver et al. | .................. | 307/31 |
| 8,213,199 B2 * | 7/2012 | Fishman | ......................... | 363/71 |
| 8,218,274 B2 * | 7/2012 | Hastings et al. | ................ | 361/42 |
| 8,330,299 B2 * | 12/2012 | Steigerwald et al. | ......... | 307/140 |
| 8,344,548 B2 * | 1/2013 | Stern | ............................... | 307/77 |
| 2003/0111103 A1 * | 6/2003 | Bower et al. | .................. | 136/244 |
| 2005/0116671 A1 * | 6/2005 | Minami et al. | ................ | 318/275 |
| 2005/0213272 A1 * | 9/2005 | Kobayashi | ....................... | 361/62 |
| 2007/0221267 A1 * | 9/2007 | Fornage | ....................... | 136/244 |
| 2007/0252716 A1 * | 11/2007 | Burger | ........................ | 340/635 |
| 2009/0000654 A1 * | 1/2009 | Rotzoll et al. | ................ | 136/244 |
| 2009/0066357 A1 * | 3/2009 | Fornage | ........................ | 324/765 |
| 2009/0160259 A1 * | 6/2009 | Naiknaware et al. | ........... | 307/82 |
| 2009/0302680 A1 * | 12/2009 | Kernahan et al. | ............... | 307/43 |
| 2010/0084924 A1 * | 4/2010 | Frolov et al. | .................... | 307/82 |
| 2010/0127570 A1 * | 5/2010 | Hadar et al. | ..................... | 307/77 |
| 2010/0253151 A1 * | 10/2010 | Gerhardinger et al. | ......... | 307/82 |
| 2011/0036386 A1 * | 2/2011 | Browder | ....................... | 136/244 |
| 2011/0090607 A1 * | 4/2011 | Luebke et al. | .................. | 361/42 |
| 2011/0198935 A1 * | 8/2011 | Hinman et al. | ................. | 307/80 |
| 2011/0273017 A1 * | 11/2011 | Borup et al. | .................... | 307/63 |
| 2012/0004780 A1 * | 1/2012 | Miller et al. | .................... | 700/286 |
| 2012/0019072 A1 * | 1/2012 | Tyagi et al. | ..................... | 307/72 |
| 2012/0126626 A1 * | 5/2012 | Falk et al. | ........................ | 307/80 |
| 2012/0152300 A1 * | 6/2012 | Zuckerman et al. | ........... | 136/244 |

(Continued)

FOREIGN PATENT DOCUMENTS

JP         10223282 A  * 8/1998  ............... H01R 9/00

Primary Examiner — Adi Amrany

(57) ABSTRACT

The invention is a novel photovoltaic power system that uses a number of relatively low-power DC to polyphase AC power converters distributed within the photovoltaic array field. In prior art megawatt-scale systems, typically one or two central power converters would be used for every 1 MW of solar photovoltaic array. With the present invention, 100 distributed power converters may be used per megawatt. The distributed power converters are sized to convert power from one or two series string of crystalline modules or from a greater but limited number of thin-film module strings and in both cases at the highest possible DC and therefore AC grid-tie voltages, with respect to module ratings and local safety code compliance.

5 Claims, 1 Drawing Sheet

(56) References Cited

U.S. PATENT DOCUMENTS

| | | | |
|---|---|---|---|
| 2012/0212065 A1* | 8/2012 | Cheng et al. ............... 307/82 |
| 2012/0306279 A1* | 12/2012 | Garabandic ............... 307/85 |
| 2013/0062957 A1* | 3/2013 | Bhavaraju et al. ............... 307/82 |
| 2013/0088086 A1* | 4/2013 | Coors et al. ............... 307/72 |

* cited by examiner

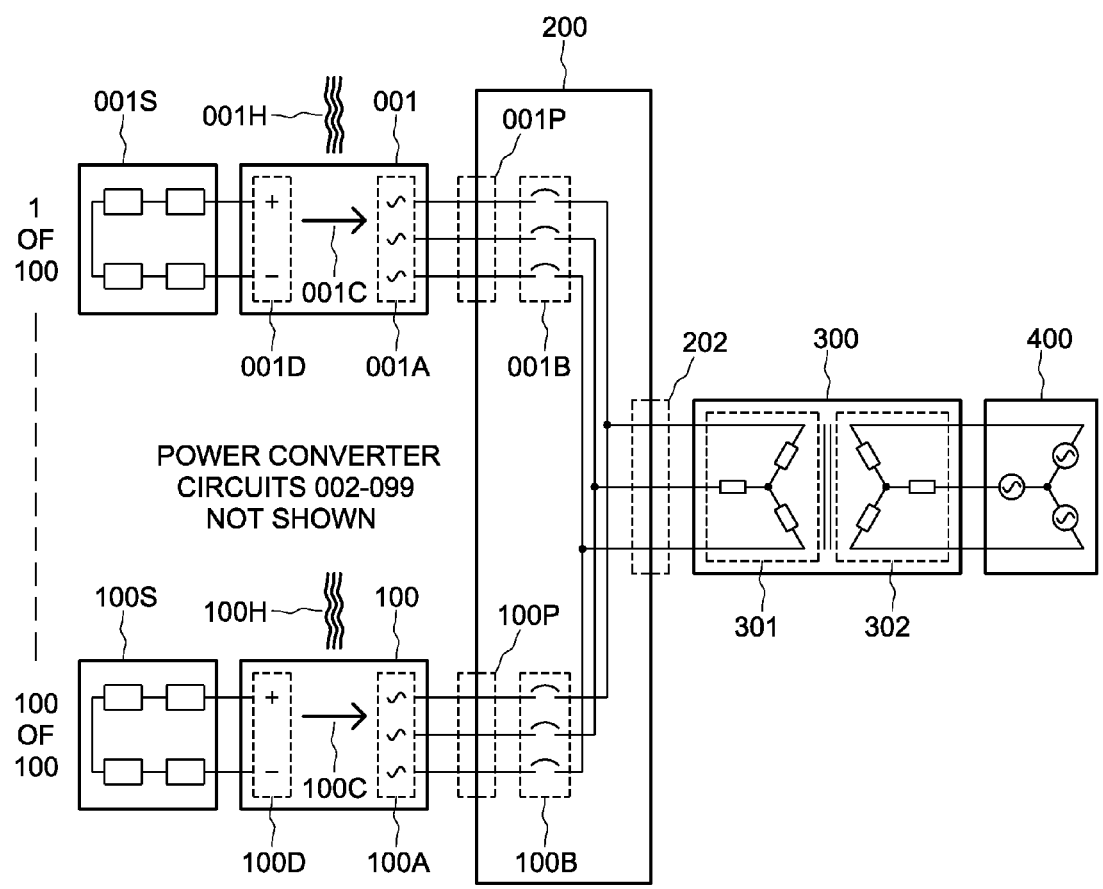

PHOTOVOLTAIC POWER SYSTEM WITH DISTRIBUTED PHOTOVOLTAIC STRING TO POLYPHASE AC POWER CONVERTERS

BACKGROUND OF THE INVENTION

Essentially all multi-megawatt scale photovoltaic (PV) power systems use a central power converter and building blocks of roughly 1 MW where DC power is collected in one location to feed a 1 MW DC-to-AC power converter or inverter. The power converter is connected locally to a distribution transformer to step up low inverter output grid-tie voltages to medium voltage distribution levels for final, system-level power collection. The advantage of this approach is inverter economies of scale. The disadvantages are that a single array ground fault or inverter failure will disable a megawatt of production, high energy DC arc potentials exist, maximum power point tracking accuracy is low compared to distributed power converter approaches, preventative maintenance is required, usable inverter lifetime is, at best, less than half that of the solar modules and inverter-specific site infrastructure costs are relatively high.

A second method, little used but a potentially emerging technology, is to use a number of low power PV string to DC power converters distributed throughout a 1 MW solar array field all sourcing power to a 1 MW DC-to-AC power converter and medium voltage distribution transformer. This solution provides higher DC collection voltages and therefore enhanced intrafield power collection efficiencies, provides greater PV maximum power tracking granularity and enables the DC-to-AC inverter stage to work at higher power conversion efficiencies. The disadvantages are that all central-inverter-related drawbacks are still in place; two-stage power conversion, PV-to-DC and then DC-to-AC, significantly limits system power conversion efficiencies, system complexity is high and the cost of fuses and disconnect switches rated above 600 Vdc (in most cases) and above 1000 Vdc (in all cases) negate any copper conductor savings.

A third method, proposed by micro-inverter manufacturers, involves using one PV to single-phase AC micro-inverter for every solar module and where one or two tiers of intrafield 60 Hz voltage step-up transformers would be required to facilitate AC power collection. This solution provides excellent system uptime because of the quasi-redundancy provided by a great number of low power inverters. Other benefits include DC arc hazard mitigation and the manufacturing potential for very high levels of power converter integration. The micro-inverter system drawbacks include inefficient, intrafield collection due to low AC inverter output voltages and/or lower tier 60 Hz step-up transformer losses, high system complexity, very low component-count-based Mean Time Before Failure (MTBF) numbers for the system, higher initial $/kW inverter costs and high inverter replacement maintenance costs. In addition, single-phase AC micro-inverters must use short-lifetime electrolytic energy storage capacitors or incur a cost premium for bulk film-type energy storage capacitors or suffer low power conversion efficiencies.

The present invention has all the advantages and none of the drawbacks associated with these three prior-art approaches.

BRIEF SUMMARY OF THE INVENTION

The invention is a novel photovoltaic power system that uses a number of relatively low-power DC to polyphase AC power converters distributed within the photovoltaic array field. In prior art megawatt-scale systems, typically one or two central power converters would be used for every 1 MW of solar photovoltaic array. With the present invention, 100 distributed power converters may be used per megawatt. The distributed power converters are sized to convert power from one or two series string of crystalline modules or from a greater but limited number of thin-film module strings and in both cases at the highest possible DC voltages, with respect to module ratings and local safety code compliance.

UTILITY OF THE INVENTION

The invention provides utility not realized by prior art approaches. Converting to relatively high polyphase AC at the PV string level allows for highly efficient, lower cost three-phase AC intrafield power collection. Energy harvest is enhanced because the PV maximum power tracking granularity is increased by orders of magnitude over a central inverter approach. The present invention is highly scalable where one DC to polyphase AC inverter type can be used for power systems of any size. From an uptime perspective, the failure of one distributed inverter in a megawatt-scale power plant is almost negligible. From a safety perspective, the collection of DC power at any one point, and the associated arc and electrocution hazards, in a photovoltaic system of any size, based on the invention, does not exceed the input power of one distributed DC to polyphase AC inverter.

In addition, the National Electric Code does not require DC ground fault interrupters for systems where DC power is converted from one or two series strings of photovoltaic modules. This enables lower-power distributed power converters to work at higher DC input voltages with longer series strings and therefore higher AC grid-tie voltages compared to central inverters where higher power, higher voltage DC switch gear and contractors are either cost prohibitive or unavailable.

BRIEF DESCRIPTION OF THE DRAWINGS

FIG. 1 is an electrical block diagram of a photovoltaic power plant according to the present invention.

DETAILED DESCRIPTION OF THE INVENTION

FIG. 1 is an electrical block diagram of a photovoltaic power system according to the present invention. For this example, it will be described as a nominal 1 megawatt power system and will use one hundred, 10 kW DC to polyphase AC power converters. For clarity, only the first DC to polyphase AC power converter, designated by reference character 001, and the last DC to polyphase AC power converter, designated by reference character 100, are shown and with associated ancillary circuits designated by like reference characters augmented with a specific suffix. DC to polyphase AC power converters 002 through 099 and the corresponding ancillary circuits are intended to be included in the system and with the same hookup as illustrated for DC to polyphase AC power converters 001 and 100. In practice, the power system could be of any size but typically would have ten or more distributed inverters per polyphase power distribution transformer to optimize the cost reduction and performance gains associated with this distributed inverter system architecture.

In FIG. 1, a number of solar photovoltaic modules are connected in a series string. The series string length could be of any size and is typically limited to maximum voltages of 600 Vdc or 1000 Vdc for monopolar PV array configurations and ±600 Vdc or ±1000 Vdc for bipolar PV array configurations, depending on the system location, ownership and level of code compliance. Multiple series strings connected in parallel can also be used.

In FIG. 1, photovoltaic series string 0015 is connected to DC input 001D of enclosed DC to polyphase AC power converter 001. DC to polyphase AC power converter 001 converts, 001C, the DC power from photovoltaic source 001S to 3-phase AC power. Heat removal 001H is by natural convection. Polyphase AC output 001A of DC to polyphase AC power converter 001 is connected to input port 001P of polyphase combiner box 200. The current sourced from polyphase AC output 001A of DC to polyphase AC power converter 001 into input port 001P flows through overcurrent protection device 001B and is summed with currents from power converter circuits 002 through 100 and flows through polyphase combiner box 200 output port 202 and into the input windings 301 of polyphase distribution transformer 300. Current then flows from polyphase distribution transformer 300 output windings 302 into three-phase electrical grid 400 to achieve positive power transfer into three-phase electrical grid 400. In this example, polyphase distribution transformer 300 is a 3-phase voltage step-up transformer, with low voltage input windings and medium voltage output windings. DC to polyphase AC power converters 001 through 100 have current source outputs and each regulate sinewave currents synchronized with utility grid 400 voltages as seen on input windings 301 of polyphase distribution transformer 300.

In FIG. 1, the remaining 99 power converter circuits are configured and function in the same way as power converter circuit 001. Power converter circuit 100 is described as an example where photovoltaic series string 100S is connected to DC input 100D of enclosed DC to polyphase AC power converter 100. DC to polyphase AC power converter 100 converts, 100C, the DC power from photovoltaic source 100S to 3-phase AC power. Heat removal 100H is by natural convection. Polyphase AC output 100A of DC to polyphase AC power converter 100 is connected to input port 100P of polyphase combiner box 200. The current sourced from polyphase AC output 100A of DC to polyphase AC power converter 100 into input port 100P flows through overcurrent protection device 100B and is summed with currents from power converter circuits 002 through 100 and flows through polyphase combiner box 200 output port 202 and into the input windings 301 of polyphase distribution transformer 300. Current then flows from polyphase distribution transformer 300 output windings 302 into three-phase electrical grid 400 to achieve positive power transfer into three-phase electrical grid 400.

The invention is a photovoltaic power system comprising a number of elements. A key element is the DC to polyphase AC power converter. A portion of this invention, directed at dependent claims herein, is specific characteristics of the power converter that enable the disclosed system to be cost effective. One novel and enabling characteristic is for the DC to polyphase AC power converter is a usable maintenance-free lifetime equivalent to that of solar photovoltaic modules. Prior art photovoltaic power converters for megawatt scale applications typically have a lifetime of 10 to 15 years and require periodic maintenance, while photovoltaic module lifetimes are typically from 20 to 25 years. To achieve longer power converter lifetimes, a DC to polyphase AC power converter is disclosed wherein; (i) the power converter is enclosed in a waterproof and dustproof enclosure, (ii) power conversion waste heat is primarily removed by natural air convection and secondarily by radiation, (iii) power conversion waste heat is removed without fans, pumps or other moving parts and (iv) electronic components within the power converter are operated by design with low operational temperature rises. A second enabling characteristic is that power converter DC to polyphase AC power conversion is accomplished with a single conversion or single stage power conversion topology in order to achieve high conversion efficiencies and a low overall component parts count, including multi-level neutral point clamp topologies. A third enabling characteristic is a DC to polyphase power converter with a power topology that allows a number of power converters to run with outputs paralleled wherein each output phase of said DC to polyphase AC power converter outputs has a line filter inductor and a line filter capacitor to filter pulse modulation switching frequencies and harmonics thereof and wherein each line filter capacitor return is connected to a DC bus capacitor such that pulse modulation switching frequency currents and harmonic currents thereof are returned to the DC bus. A fourth enabling characteristic is a power converter supplied with external bulkhead-mounted connectors for coupling DC inputs and/or polyphase AC outputs, in a plug-and-play fashion, and where the connectors can be accessed without disrupting the environmental integrity provided by the power converter enclosure and without exposing workers to hazardous voltages. A fifth enabling characteristic is a power converter which comprises a means for converting DC power from bipolar photovoltaic potentials up to ±1000 Vdc to 3-phase power at grid-tie voltage potentials of typically 600 Vac line-to-line and as high as to 1000 Vac line-to-line and where the photovoltaic bipolar potentials can be symmetric or asymmetric with respect to earth ground or with respect to a common mode DC voltage on polyphase distribution transformer input windings.

What I claim as my invention is:

1. A photovoltaic power system comprising;
   a plurality of photovoltaic modules,
   a plurality of DC to polyphase AC power converters each comprising a DC input,
   a polyphase AC output, a primary heat removal means, an environmental protection means and a power conversion means,
   a polyphase AC combiner box as a separate system component or subassembly comprising a plurality of polyphase input ports, each with an associated and unique input port circuit and each with an associated and unique polyphase circuit breaker or polyphase fuse set, an output port and a means for paralleling the input port circuits at the output port and
   a polyphase distribution transformer comprising a set of input windings and a set of output windings and
   wherein each said DC to polyphase AC power converter primary heat removal means is natural convection air cooling and
   wherein each said DC to polyphase AC power converter environmental protection means is an enclosure which is environmentally sealed and is at least waterproof and dustproof and
   wherein a portion of said plurality of photovoltaic modules are coupled to said DC input of each of said plurality of DC to polyphase AC power converters and
   wherein at least one said DC to polyphase AC power converter polyphase AC output is coupled to a unique polyphase combiner box input port and
   wherein said polyphase combiner box output port is coupled to said set of polyphase distribution transformer input windings and
   wherein said set of polyphase distribution transformer output windings are coupled to a polyphase electrical grid.

2. The photovoltaic power system according to claim 1 wherein said portion of said plurality of photovoltaic modules coupled to the DC input of each of said plurality of DC to polyphase AC power converters is limited to one or two series-connected strings of photovoltaic modules.

3. The photovoltaic power system according to claim 1 wherein said portion of said plurality of photovoltaic modules coupled to the DC input of each of said plurality of DC to polyphase AC power converters is limited to one or two series-connected bipolar strings of photovoltaic modules with both positive and negative voltage potentials with respect to earth ground or with respect to a common mode voltage of said set of polyphase distribution transformer input windings.

4. The photovoltaic power system according to claim 1, wherein each said DC to polyphase AC power converter further comprises connectors external to the enclosure as a means for making connections to said DC to polyphase AC power converter DC inputs and polyphase AC outputs without opening the enclosure to the elements.

5. The photovoltaic power system according to claim 1 wherein each said DC to polyphase AC power converter power conversion means comprises a line filter inductor and a line filter capacitor to filter pulse modulation switching frequencies and harmonies thereof and wherein each line filter capacitor return is coupled to a DC buss or other static point such that pulse modulation switching frequency currents and harmonic currents thereof are returned to the DC buss or other static point and as such contained within a given power converter as a means for enabling a number of power converters to operate with outputs coupled in parallel with negligible interaction between paralleled power converters and without the requirement to synchronize any operation of paralleled power converters.

* * * * *